US012747745B2

(12) United States Patent
Hummel

(10) Patent No.: US 12,747,745 B2
(45) Date of Patent: Sep. 29, 2026

(54) QUICK COUPLING PLANT SUPPORT

(71) Applicant: Curt Hummel, Cypress, TX (US)

(72) Inventor: Curt Hummel, Cypress, TX (US)

(*) Notice: Subject to any disclaimer, the term of this patent is extended or adjusted under 35 U.S.C. 154(b) by 86 days.

(21) Appl. No.: 18/823,032

(22) Filed: Sep. 3, 2024

(65) Prior Publication Data

US 2025/0072339 A1 Mar. 6, 2025

Related U.S. Application Data

(60) Provisional application No. 63/580,351, filed on Sep. 1, 2023.

(51) Int. Cl.
*F16B 2/08* (2006.01)
*A01G 17/12* (2006.01)
(Continued)

(52) U.S. Cl.
CPC ................ *F16B 2/08* (2013.01); *A01G 17/12* (2013.01); *F16B 2/22* (2013.01); *A01G 17/10* (2013.01)

(58) Field of Classification Search
CPC ... F16B 2/08; F16B 2/22; A01G 17/12; A01G 17/10; A01G 9/128
(Continued)

(56) References Cited

U.S. PATENT DOCUMENTS 1,128,277 A * 2/1915 Adler ...................... B66C 1/422 248/228.3
3,026,751 A * 3/1962 Bergman ................ B25B 13/12 81/129
(Continued)

FOREIGN PATENT DOCUMENTS

CA 2943726 A1 7/2017
FR 2731583 A1 9/1996
(Continued)

OTHER PUBLICATIONS

Gripple, "Tree Guying Kit," An efficient solution for the protection of newly planted trees, Assessed Sep. 5, 2024, 6 pages.
(Continued)

*Primary Examiner* — Muhammad Ijaz
(74) *Attorney, Agent, or Firm* — Thompson Patent Law Offices PC

(57) ABSTRACT

Apparatus and associated methods relate to a quick coupling plant support. In an illustrative example, the plant support bracket may, for example, include a body with a first and a second side, where a coupling member on the first side is configured to releasably couple a pliable object. The coupling member may, for example, include a head with an interior aperture and peripheral walls that deform to securely attach to the body. The coupling member may, for example, include a band that may be secured at multiple predetermined points across the body for adjustable positioning. Various embodiments may advantageously include padding on the opposing side of the head to protect the pliable object from damage. The plant support bracket may, for example, include opposing jaws actuated by an urging member on the second side of the body to secure the bracket to a support member in a crossing direction.

18 Claims, 15 Drawing Sheets

(51) Int. Cl.
*F16B 2/22* (2006.01)
*A01G 17/10* (2006.01)

(58) Field of Classification Search
USPC .... 248/65, 229.12, 229, 13, 229.14, 229.22, 248/229.23, 229.24, 228, 3, 228.4, 228.5, 248/316.4, 316.5, 316.6, 229.17, 228.8, 248/230.8, 74.3
See application file for complete search history.

(56) References Cited

U.S. PATENT DOCUMENTS

| | | | | |
|---|---|---|---|---|
| 3,241,800 | A * | 3/1966 | Richter, III | F16L 3/137 248/230.9 |
| 4,852,299 | A | 8/1989 | Smoak et al. | |
| 6,290,195 | B1 * | 9/2001 | Deuer | H01Q 1/1228 248/230.8 |
| 10,857,954 | B1 * | 12/2020 | Kumar | B60R 13/0243 |
| 10,954,666 | B2 | 3/2021 | Somerfield | |
| 11,649,878 | B2 | 5/2023 | Fisher et al. | |
| 11,730,088 | B2 * | 8/2023 | Koenig | A01G 9/024 47/47 |
| 11,852,213 | B2 | 12/2023 | Reynolds | |
| 2011/0162171 | A1 * | 7/2011 | Gmeilbauer | F16B 5/065 24/16 R |
| 2011/0167719 | A1 | 7/2011 | Decker | |
| 2013/0014437 | A1 * | 1/2013 | Schutter | A01G 27/003 177/60 |
| 2015/0164206 | A1 * | 6/2015 | Reed | A45F 5/021 24/3.12 |
| 2016/0029575 | A1 * | 2/2016 | Marke | A01G 9/128 47/44 |
| 2016/0281920 | A1 * | 9/2016 | Perez | F16M 13/022 |
| 2018/0070542 | A1 * | 3/2018 | Lockhart | A01G 9/024 |
| 2019/0032313 | A1 * | 1/2019 | Pottle | E03C 1/33 |
| 2019/0343313 | A1 * | 11/2019 | Sanborn | F16B 2/08 |
| 2021/0080217 | A1 * | 3/2021 | Richards | F16M 13/022 |
| 2021/0270408 | A1 * | 9/2021 | Trudnak | F16M 13/02 |
| 2022/0074541 | A1 | 3/2022 | Edgington et al. | |
| 2022/0297910 | A1 * | 9/2022 | Betcher | B65D 63/1063 |
| 2022/0324529 | A1 * | 10/2022 | Sieme | B62J 11/00 |
| 2022/0364382 | A1 * | 11/2022 | LeVey | F16B 2/08 |
| 2022/0390064 | A1 * | 12/2022 | Rogers | F16B 2/00 |
| 2023/0291192 | A1 | 9/2023 | Sunderland | |
| 2023/0375071 | A1 | 11/2023 | Reynolds | |
| 2024/0026910 | A1 | 1/2024 | Barnes | |
| 2025/0072339 | A1 * | 3/2025 | Hummel | A01G 17/12 |

FOREIGN PATENT DOCUMENTS

| | | | |
|---|---|---|---|
| FR | 3106467 | A3 | 7/2021 |
| GB | 2563223 | A | 12/2018 |

OTHER PUBLICATIONS

Gripple, End-Fixing C-Clip, 1 page.

* cited by examiner

QUICK COUPLING PLANT SUPPORT

CROSS-REFERENCE TO RELATED APPLICATIONS

This application claims the benefit of U.S. Application Ser. No. 63/580,351, titled "Agriculture Line System" filed by Curt Hummel on Sep. 1, 2023. This application incorporates the entire contents of the foregoing application herein by reference.

The subject matter of this application may have common inventorship with and/or may be related to the subject matter of U.S. Design patent Ser. No. D1,011,151S, titled "Plant Stake Apparatus," filed by Curt Hummel, et al., on Mar. 10, 2021. This application incorporates the entire contents of the foregoing application herein by reference.

TECHNICAL FIELD

Various embodiments relate generally to agriculture.

BACKGROUND

Plant support systems such as agricultural lines and plant brackets may, for example, be used in optimizing the cultivation of various crops and ornamental plants. Plant systems may, for example, facilitate the efficient use of space and enhance the accessibility of plants for maintenance and harvest. Agricultural lines may, for example, include durable wires and/or ropes that can be adjusted to support the weight and growth pattern of different plants. Plant brackets may, for example, serve as secure points of attachment that help guide and stabilize plants as they grow. Together, plant brackets and agriculture lines may, for example, be used in structuring the physical layout of farms and gardens, ensuring that plants receive optimal conditions for growth.

Trees, for example, may, for example, use sturdy brackets to support young, fruit-laden, and/or weak branches, preventing breakage and promoting healthier development. Vines such as grapes and climbing beans may, for example, be trained along trellises and/or wires, which helps to maximize their exposure to sunlight and air, important for fruit production. Flowering plants may, for example, rely on these structures to provide the necessary support to ascend and flourish visually.

The intersection of plant support systems with the cultivation of trees, vines, and flowering plants presents numerous advantages. For trees, agricultural lines may, for example, be used to create patterns to save space and/or enhance fruit production by exposing more of the tree's surface to sunlight. In vineyards, the strategic use of trellises and wires may, for example, be used to support the weight of growing grapevines. The use of plant supports may, for example, facilitate easier pruning and harvesting, leading to higher quality grapes. For flowering plants, the arrangement provided by plant brackets and lines may, for example, increase the visual appeal and/or produce.

SUMMARY

Apparatus and associated methods relate to a quick coupling plant support. In an illustrative example, the plant support bracket may, for example, include a body with a first and a second side, where a coupling member on the first side is configured to releasably couple a pliable object. The coupling member may, for example, include a head with an interior aperture and peripheral walls that deform to securely attach to the body. The coupling member may, for example, include a band that may be secured at multiple predetermined points across the body for adjustable positioning. Various embodiments may advantageously include padding on the opposing side of the head to protect the pliable object from damage. The plant support bracket may, for example, include opposing jaws actuated by an urging member on the second side of the body to secure the bracket to a support member in a crossing direction.

In various embodiments, the plant support bracket may achieve one or more advantages. For example, some embodiments may include a coupling member configured to releasably couple to a pliable object extending along a first axis in a first direction. The coupling member may, for example, offer a quick and secure method of attachment and detachment. The coupling member may, for example, allow for regular adjustments as plants grow and/or as seasonal change. Some embodiments may feature a body coupled to the coupling member with opposingly biased jaws actuated by an urging member. The jaws may, for example, be advantageously configured such that the jaws releasably couple the body to a support member extending along a second axis in a second direction that intersects the first direction. The jaws may, for example, provide stability and support to ensuring the plant support bracket maintains a firm grip on both the plant and the support structure.

The details of various embodiments are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF ILLUSTRATIVE EMBODIMENTS

To aid understanding, this document is organized as follows. First, to help introduce discussion of various embodiments, a quick coupling plant support is introduced with reference to FIGS. 1-2. Second, that introduction leads to a description with reference to FIGS. 3-5 of some exemplary embodiments of the quick coupling plant support. Third, with reference to FIGS. 6-8 of some exemplary schematic views of some exemplary parts of the quick coupling plant support. Fourth, with reference to FIGS. 9-17, the discussion turns to some exemplary views of the quick coupling plant support body. Fifth, with reference to FIGS. 18-19, this document describes an exemplary system diagram and exemplary method flow chart.

Figure 1:
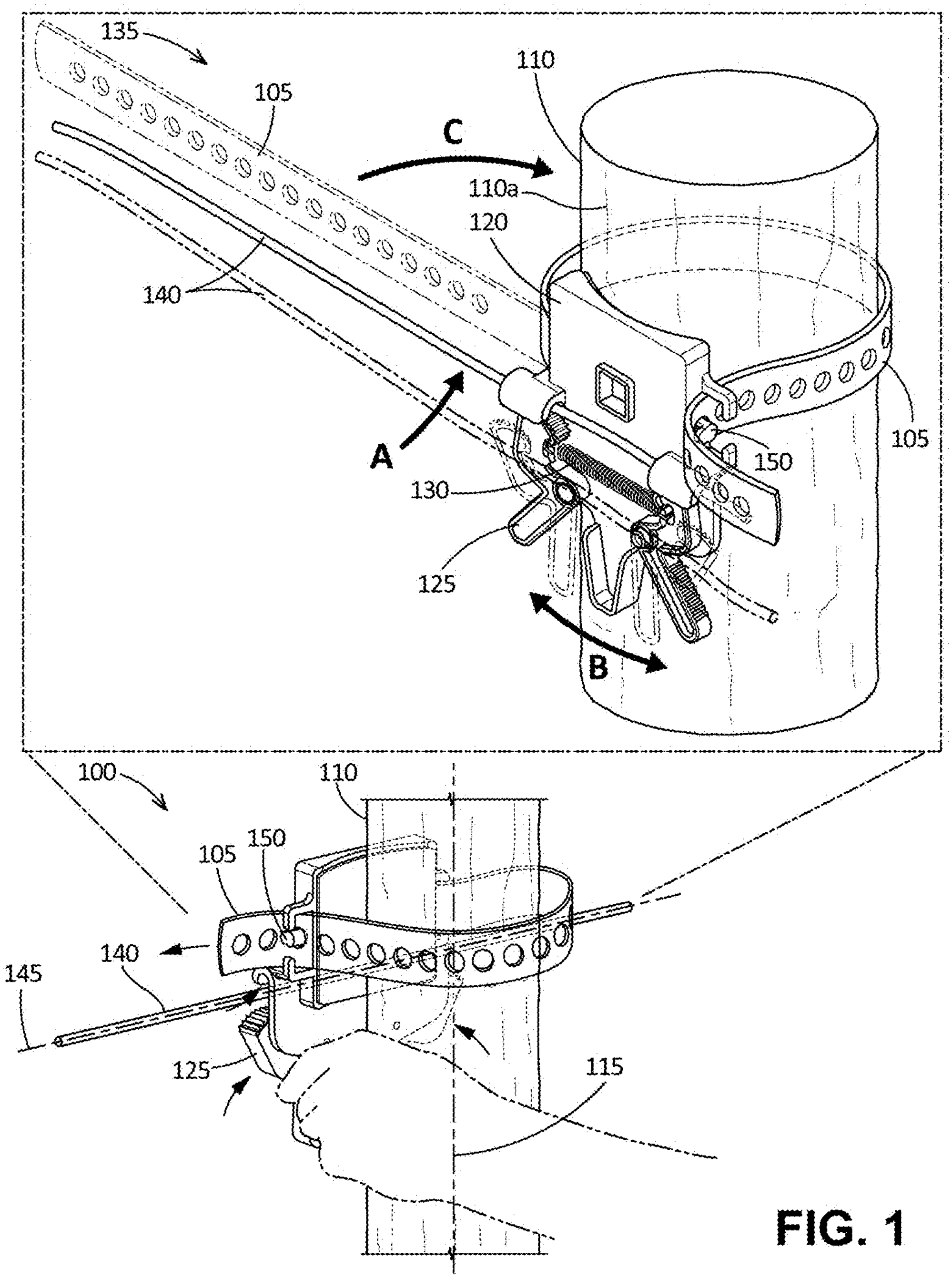
FIG. 1 depicts an exemplary quick coupling plant support employed in an illustrative use-case scenario.

FIG. 1 depicts an exemplary plant employed in an illustrative use-case scenario 100. The illustrative use case scenario includes a pliable object 110. The pliable object may, for example, include an exterior surface 110*a*. The exterior surface may, for example, include bark. The surface may, for example, include a plant's epidermis. The pliable object 110 extends along a first axis 115 extending along the longitudinal direction of the pliable object.

The pliable object may, for example, include a tree. The pliable object may, for example, include a plant. The pliable object may, for example, include a flowered plant. The pliable object may, for example, include a vine system. In some embodiments, the quick coupling plant support may accommodate non-plant elements. For example, pliable objects may include artificial vines, decorative strings, and/or cables within landscape designs.

The illustrative use-case scenario 100 includes a coupling member 105. The coupling member may, for example, include a fastener. The coupling member may, for example, include a strap. The coupling member may, for example, include a head portion. The coupling member protrusion may, for example, deform to couple the coupling member to the body. The deformation may, for example, be elastic.

The coupling member 105 may, for example, fasten to a body 120. The head portion of the coupling member may, for example, fasten to the body. The body may, for example, include a housing. The housing may, for example, include an aperture configure to receive the head of the coupling member.

The coupling member 105 may, for example, releasably couple to the body 120. The coupling member may, for example, include a protrusion positioned in a middle portion of the head that may, for example, be pushed into an aperture positioned in a middle portion of the body.

The strap of the coupling member may, for example, be threaded through an attachment clip. The coupling member may, for example, coupled to the body by the threading of the strap through the attachment clip and the releasable coupling of the protrusion of the head portion to the middle aperture of the body. The coupling member strap may, for example, include at least one aperture following a middle path along the strap. The coupling member strap apertures may, for example, engage with a securement mechanism 150. The securement mechanism may, for example, include a securement clip. The securement mechanism may, for example, include a protrusion with a lip configured such that the protrusion may, for example, be inserted into the aperture to set the coupling member to enclose an area interior to the strap of the coupling member.

The illustrative use-case scenario 100 includes a support member 140. The support member may, for example, include a cable. The support member may, for example, include a beam. The support system may, for example, include a cord. The support member may, for example, include an agriculture line. The support member 140 may, for example, extend along a second axis 145 extending along the longitudinal direction of the support member.

The illustrative use-case scenario 100 includes a pair of biased jaw engagement members 125. The pair of biased jaw engagement members 125 are coupled to the body 120. The pair of biased jaw engagement members 125 are urged together by an urging member 130.

The illustrative use-case scenario includes an exemplary quick coupling plant support assembly 135. The exemplary quick coupling plant support assembly includes the body 120. The exemplary plant support assembly includes the jaws 125. The exemplary plant support assembly 135 includes the urging member 130. The exemplary plant support assembly 135 includes the coupling member 105.

As depicted in motion A, the upper engagement member of the body 120 is depicted being placed on the support member 140. The jaws 125 may, for example, be separated by a user to clip the jaws onto the support member 140. The jaws 125 may, for example, be urged together by the urging member 130.

As depicted in motion B, the jaws may be separated by a user exerting force onto the handles of the jaw engagement members. The jaws may, for example, return to their original position using the urging member 130.

In some embodiments, the quick coupling plant support may, for example, be adapted to include jaws that are opposed in urging directions. The urging members may, for example, include at least one extension spring. The urging members may, for example, include at least one compression spring. In some embodiments, an extension spring may, for example, be used as an urging member such that the extension spring elongates between the jaws, exerting a pulling force to open the jaws when activated, suitable for a quick release mechanism.

In some embodiments, the quick coupling plant support may incorporate a compression spring that compacts between the jaws, pushing them open and providing a robust clamping force necessary for heavier plants.

In some embodiments, the quick coupling plant support may feature a torsion spring mechanism, such that the urging member includes a spring that coils around a pivot point, exerting rotational force to the jaws for a gripping action. A torsion spring may, for example, be beneficial for delicate and/or sensitive plants, as the torsion spring may be finely adjusted to avoid damage.

As depicted in motion C, the body 120 may, for example, be fastened to the pliable support member when the coupling member is secured to the body and is fastened around the pliable member to the securement mechanism (e.g., fastening clip) used to fasten the body to the pliable member. The body and coupling member may, for example, be fastened loosely to the pliable member. The pliable member may, for example, include a tree which may, for example, grow. The looseness may, for example, enable the tree to grow in a controlled environment along a selected direction.

In some embodiments, the quick coupling plant support may, for example, be adapted for situations where the support member (e.g., cable, cord, beam) is positioned vertically, while the pliable object is oriented horizontally. Different structurally positions may, for example, facilitate the growth of plants across a horizontal plane, suitable for creating living walls and/or garden ceilings.

In some embodiments, the quick coupling plant support may, for example, be used when both the plant and the support member are oriented parallel to each other. In this arrangement, the coupling member may be rotated to align with the parallel orientation, effectively supporting the pliable object (e.g., climbing plants) growing alongside structural supports such as fences and/or trellises.

Figure 2:
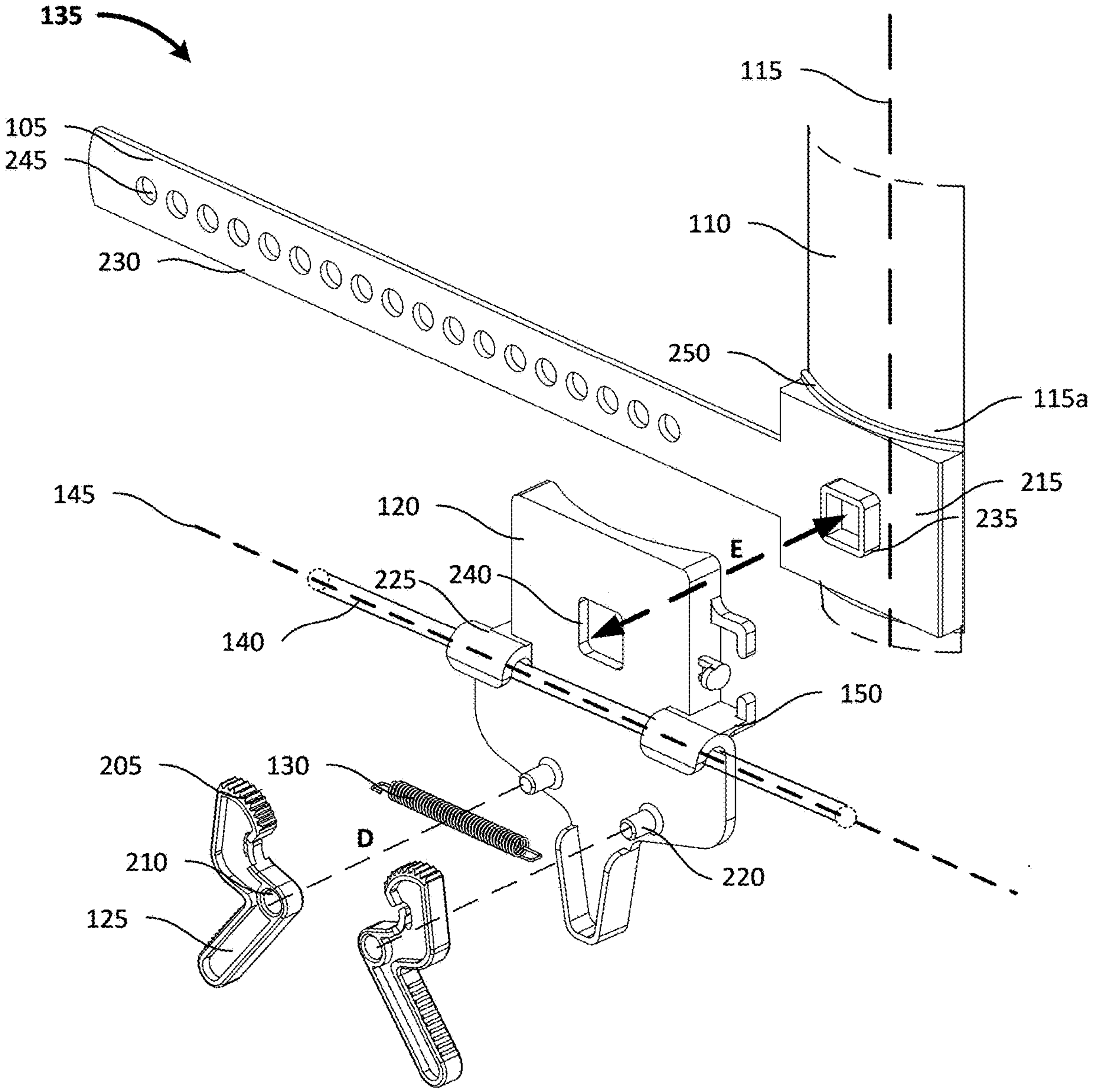
FIG. 2 depicts an exemplary quick coupling plant support depicting an exemplary an exemplary assembly view of the body, pliable object, urging member, jaw engagement members, and coupling members.

FIG. 2 depicts an exemplary quick coupling plant support depicting an exemplary an exemplary assembly 135 view of the body, pliable object, urging member, jaw engagement members, and coupling members.

The exemplary assembly 135 includes an exemplary pair of jaw engagement members 125. The exemplary pair of jaw engagement members include an exemplary set of teeth. The teeth may, for example, include a set of predetermined grooves used to frictionally grip the support member (e.g., cable, cord, agriculture line). The set of grooves may, for example, be straight. The set of grooves may, for example, be in some embodiments curved. The exemplary pair of jaw engagement members 125 include a set of coupling apertures 210.

As depicted in motion D, the exemplary pair of jaw engagement jaws may, for example, use the set of coupling apertures to couple to a pair of hinges 220 of the body of the quick coupling plant support. The jaws may, for example, frictionally couple to the body. The jaws may, for example, elastically deform to couple to the hinges of the body. The jaws may, for example, clip onto the body. The jaws may, for example, be screwed onto the body. The jaws may, for example, rotate while coupled to the body. The jaws 125 are coupled together by the urging member 130. The urging member may, for example, include a compression spring. The jaws 125 may engage with the support member 140 extending along the second horizontal direction 145. The jaws 125 may, for example, clamp onto the support member with the teeth 205 as the cable is pressed unto at least one upper engagement member 225.

The exemplary assembly 135 includes the body 120. The body 120 includes a body aperture 240. The body aperture may, for example, be place in the middle portion of the body.

The exemplary assembly includes the coupling member 105. The coupling member 105 includes a set of apertures 245. The set of apertures 245 may engage with the securement mechanism 150 as depicted in motion C in FIG. 1.

Figure 7:
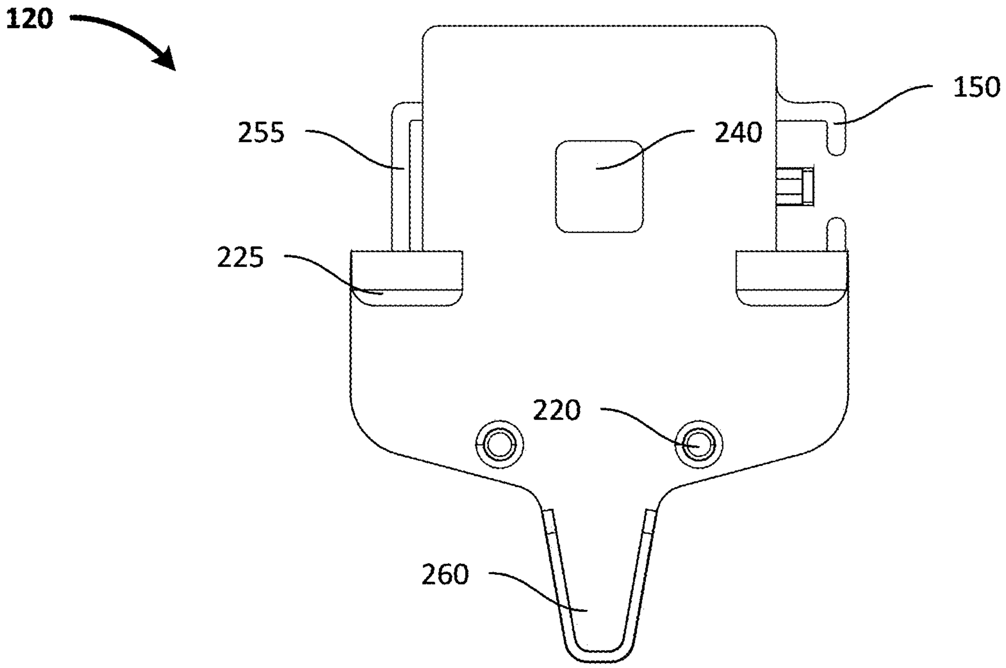
FIG. 7 depicts the exemplary front view of an exemplary quick coupling support body.

The coupling member 105 includes a head 215. The head may, for example, be squared shaped. The head may, for example, include a protrusion 235. The protrusion may, for example, be used to couple the head of the coupling member to the body such that the protrusion is inserted into the body aperture as depicted in motion E. The head may extend to a band 230, where the band may, for example, be threaded through an attachment clip 255 (as depicted in FIG. 7).

The interface between the coupling member and the attachment clip and the interface between the protrusion and the body aperture may, for example, be used to anchor the coupling member to the body. The anchoring may, for example, be used as a user secures the other end of the band to the securement clip located on the other side of the body.

The head of the coupling member includes padding 250. The padding interfaces with the pliable member at a surface **115*a*. The padding may, for example, couple to the surface 110*a*** of the pliable member. The padding may, for example, be used to prevent damage to the surface of the plant life and/or the coating of the pliable object.

Figure 3:
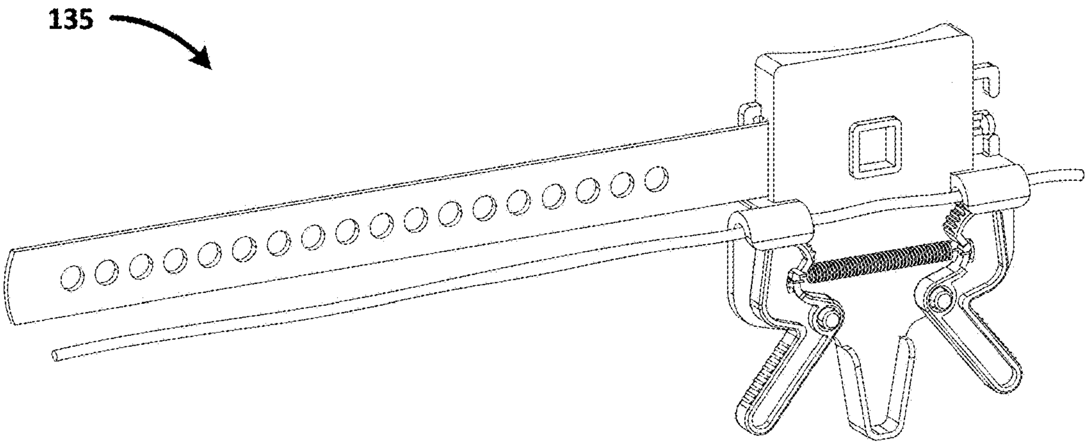
FIG. 3 depicts a right front perspective view of the exemplary quick coupling plant support.
Figure 4:
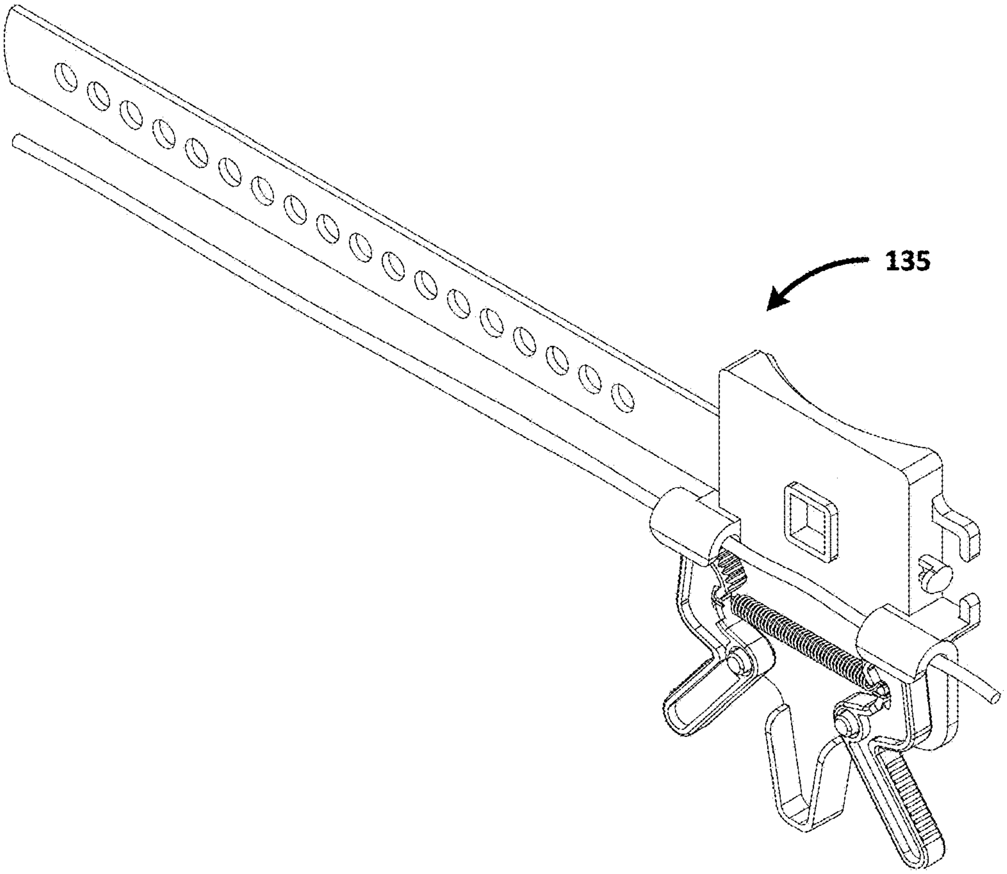
FIG. 4 depicts a left front perspective view of the exemplary quick coupling plant support.
Figure 5:
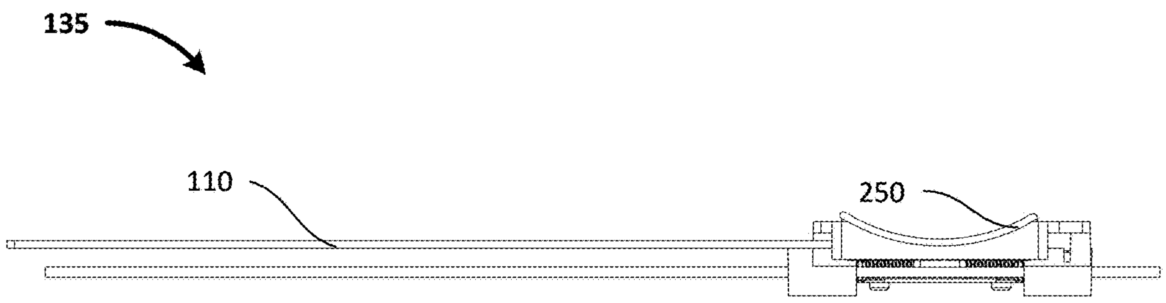
FIG. 5 depicts a top view of the exemplary quick coupling plant support.
Figure 6:
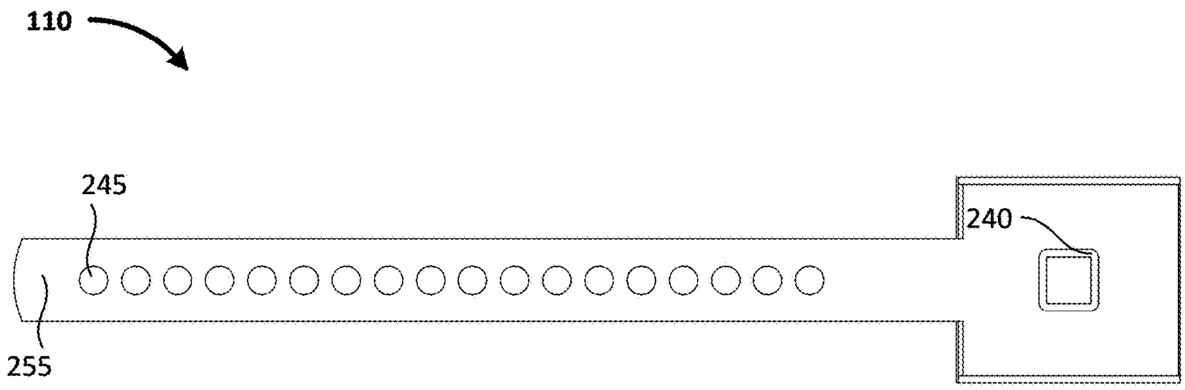
FIG. 6 depicts the exemplary quick coupling plant support coupling member.

FIGS. 3-4 depict perspective views of the exemplary quick coupling plant support assembly 135. FIG. 5 depicts a top view of an exemplary quick coupling plant support assembly 135. FIG. 6 depicts an exemplary quick coupling plant support coupling member 105.

FIG. 7 depicts an exemplary front view of an exemplary quick coupling support body 120. The quick coupling support body includes the attachment clip 255. The attachment clip may, for example, couple to the head of the coupling member as the band is threaded through the attachment clip. The attachment clip may, for example, be used alongside the interface between the protrusion of the head and the aperture of the body to couple the coupling member to the body. The body 120 includes a jaw interface 260. The jaw interface 260 may, for example, prevent the urging member extending past a predetermined length, such that the urging member may, for example, not deform. In some embodiments, the urging member may, for example, include an elastic band.

Figure 8:
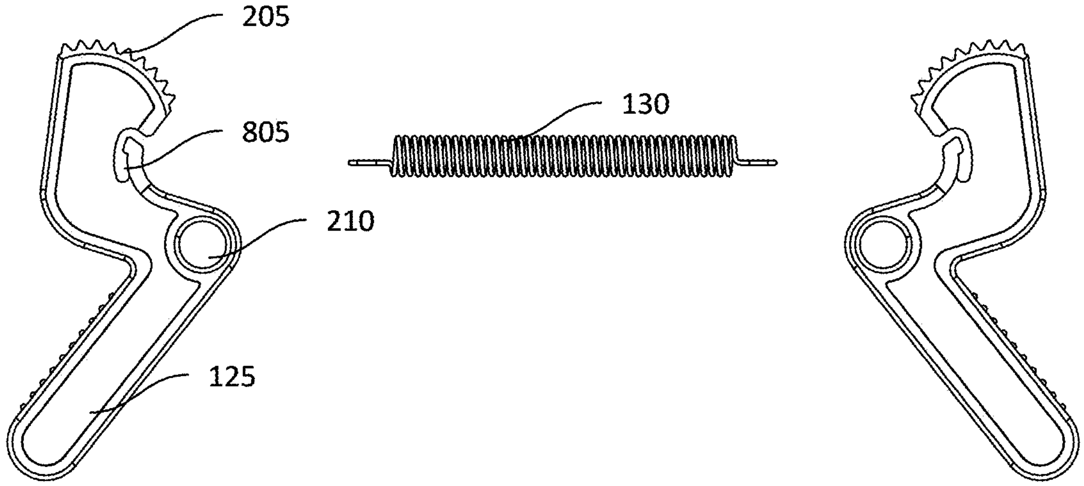
FIG. 8 depicts the exemplary front view of an exemplary jaw engagement member and urging members.
Figure 9:
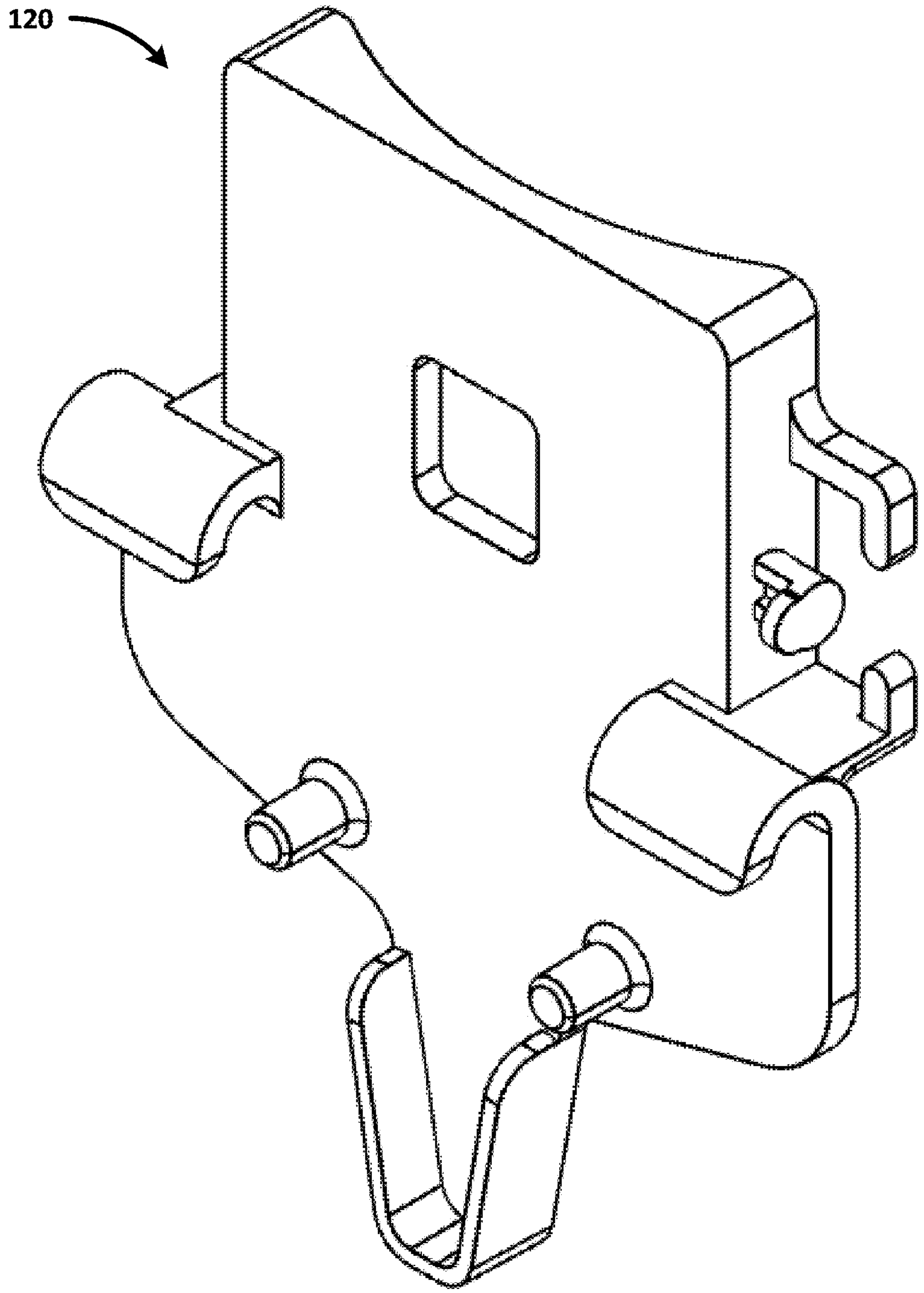
FIG. 9 depicts an exemplary right front perspective view of the exemplary quick coupling support body.
Figure 10:
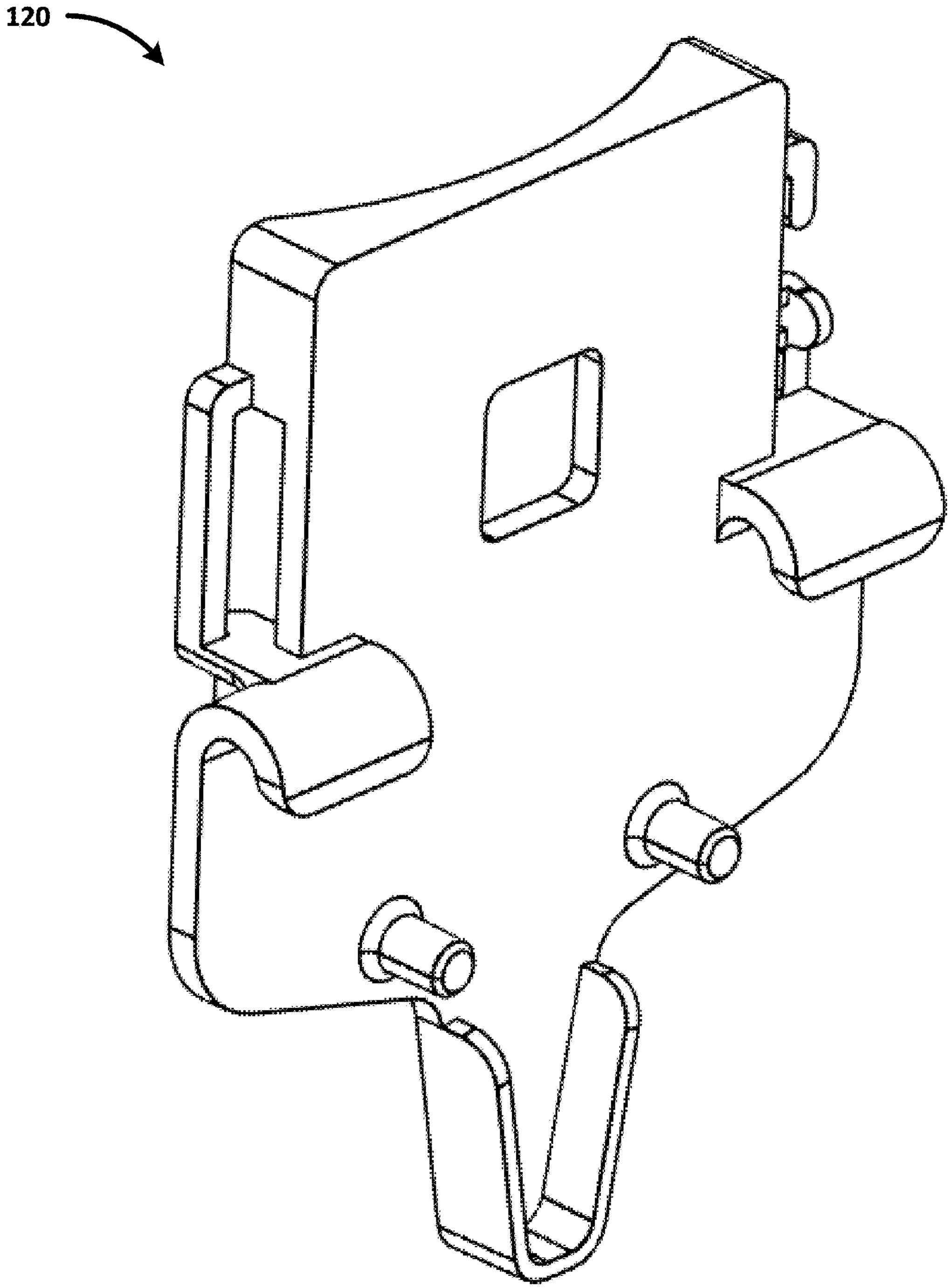
FIG. 10 depicts an exemplary left front perspective view of the exemplary quick coupling support body.

FIG. 8 depicts an exemplary front view of an exemplary jaw engagement member and urging members 125. The jaw engagement members include urging member coupling points 805. The urging member may, for example, latch on at the coupling points to releasably couple the urging member to the jaw. The coupling may, for example, be used to actuate the jaws in connection with the urging member.

Figure 11:
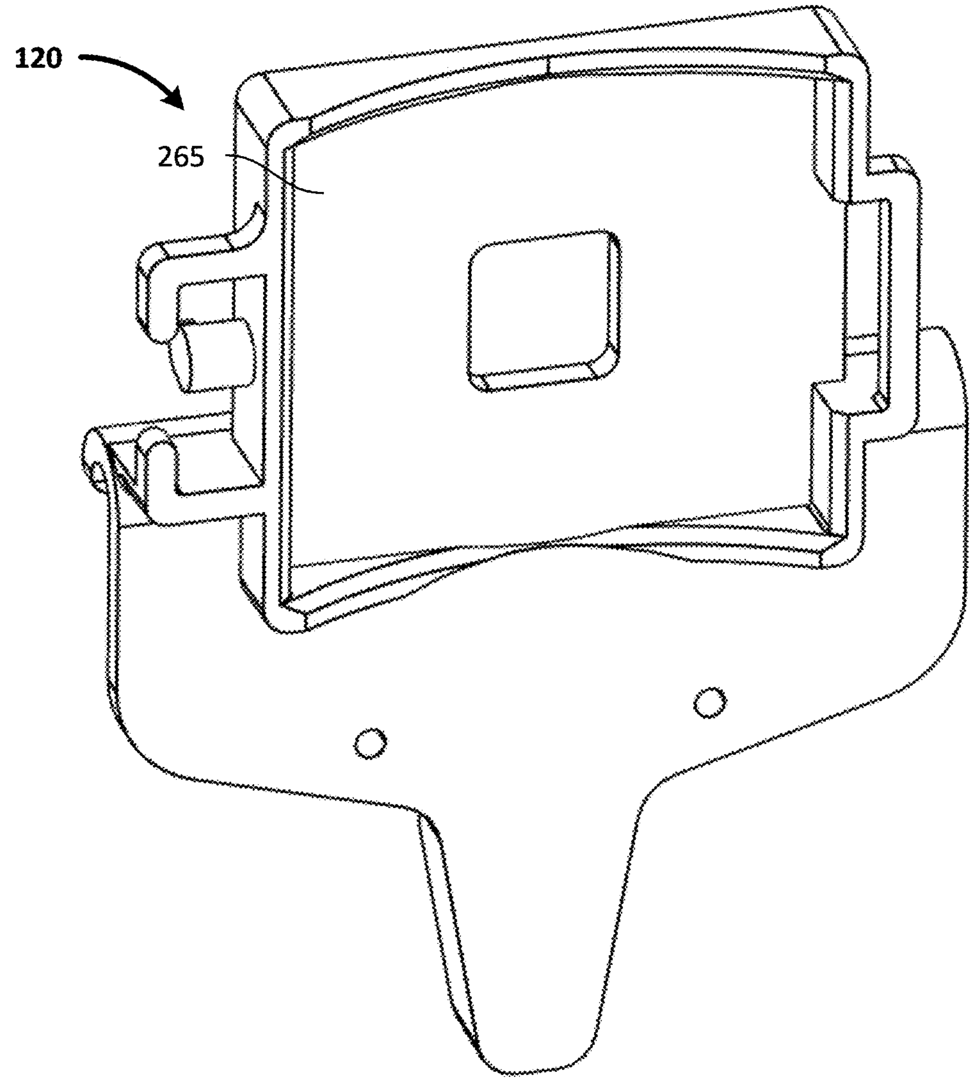
FIG. 11 depicts an exemplary rear perspective view of the exemplary quick coupling support body.
Figure 12:
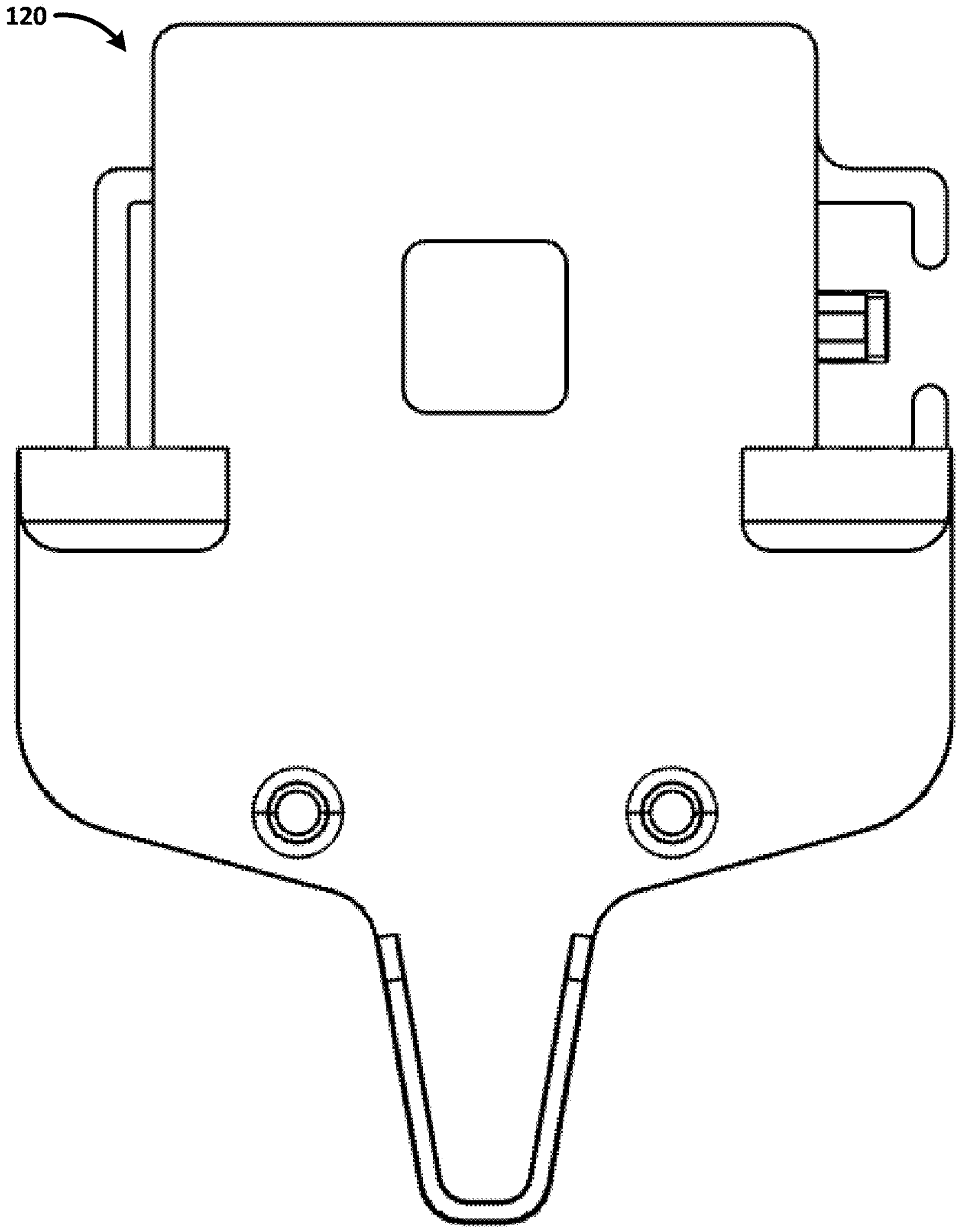
FIG. 12 depicts an exemplary front view of the exemplary quick coupling support body.
Figure 13:
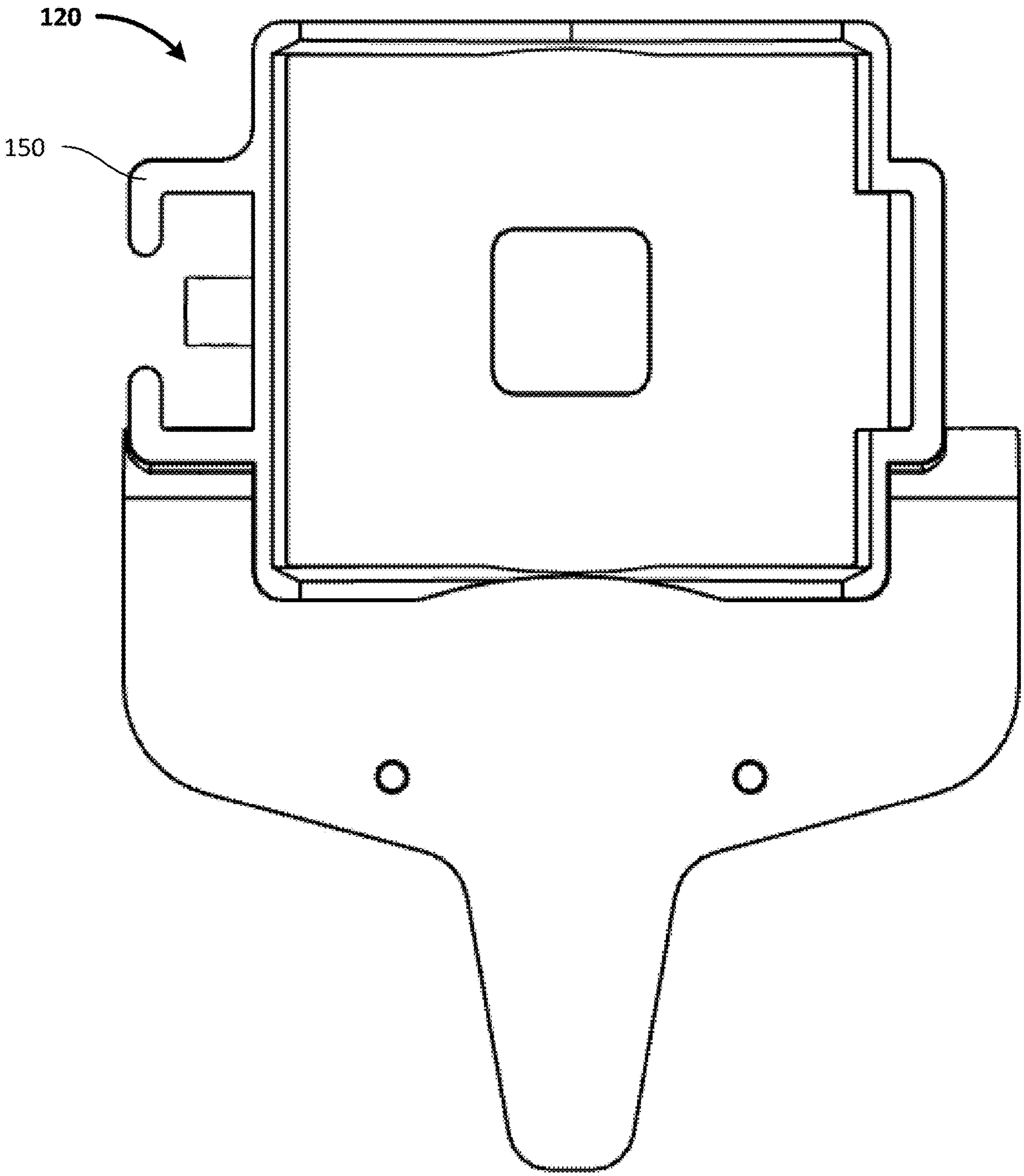
FIG. 13 depicts an exemplary rear view of the exemplary quick coupling support body.
Figure 14:
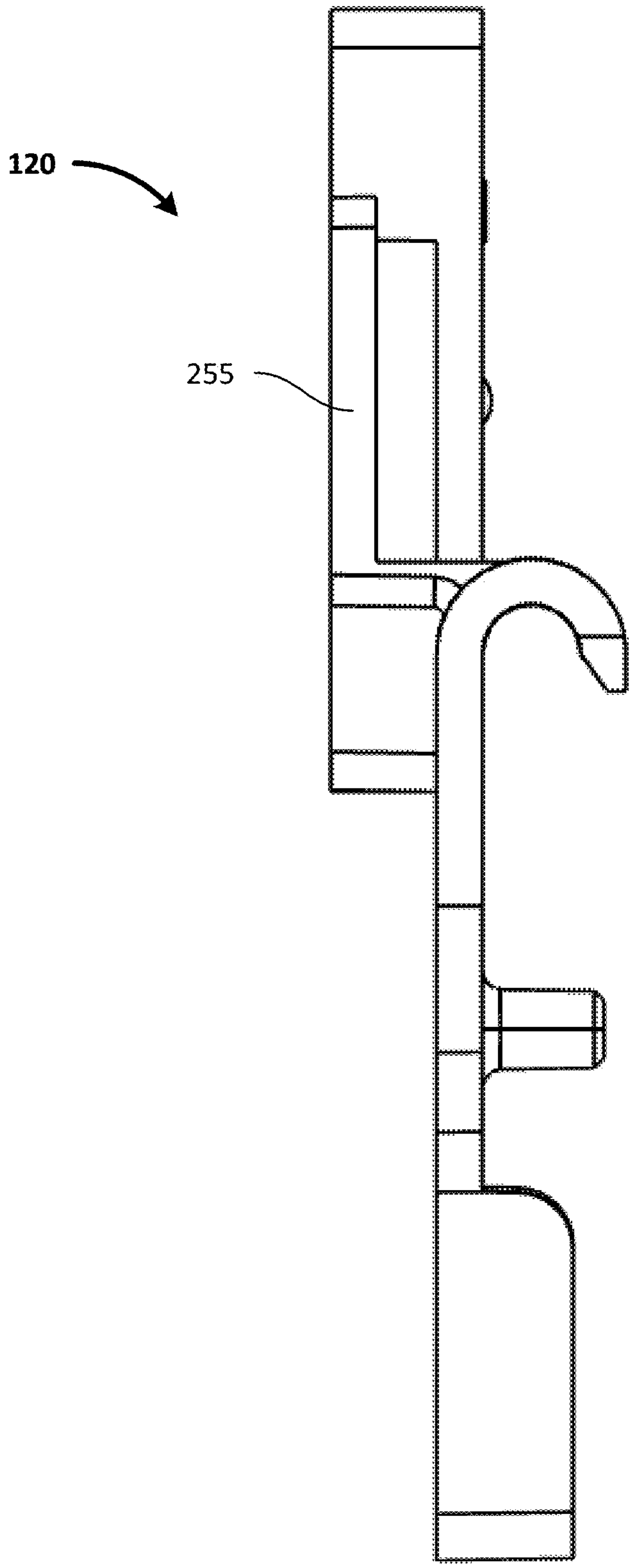
FIG. 14 depicts an exemplary left view of the exemplary quick coupling support body.
Figure 15:
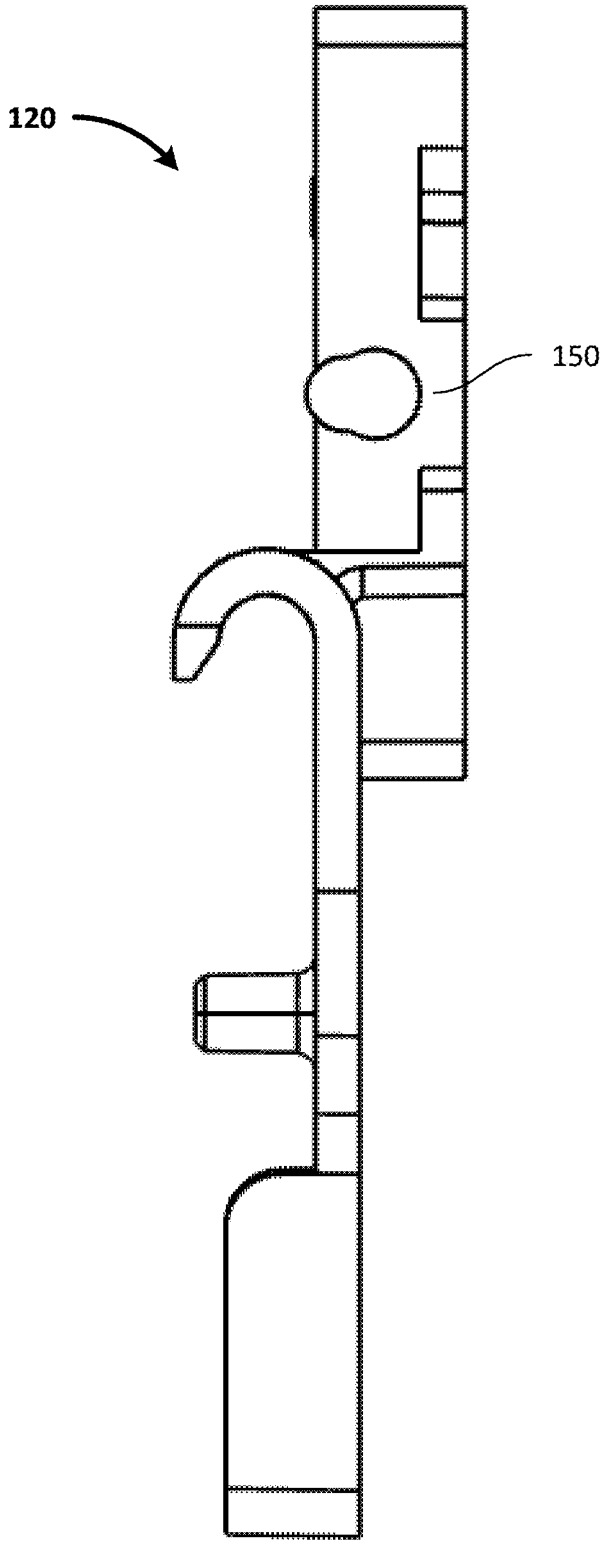
FIG. 15 depicts an exemplary right view of the exemplary quick coupling support body.
Figure 16:
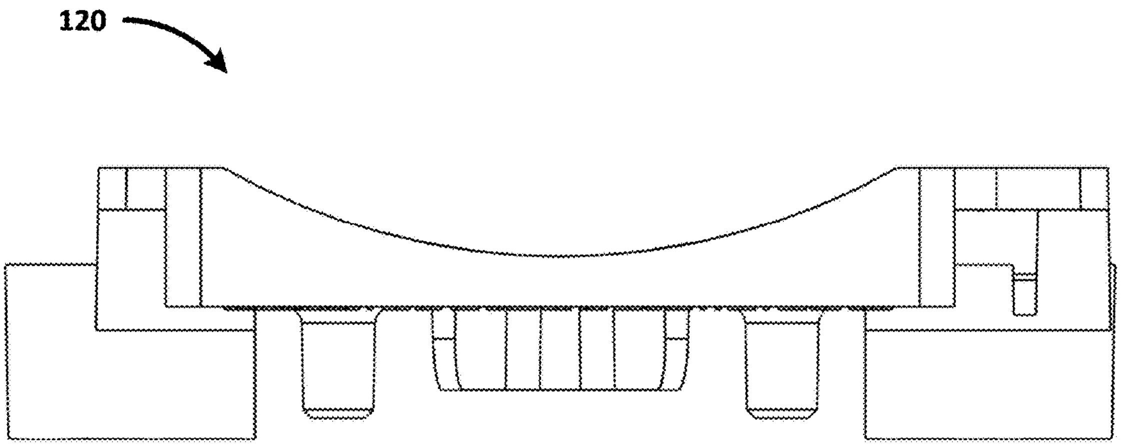
FIG. 16 depicts an exemplary top view of the exemplary quick coupling support body.
Figure 17:
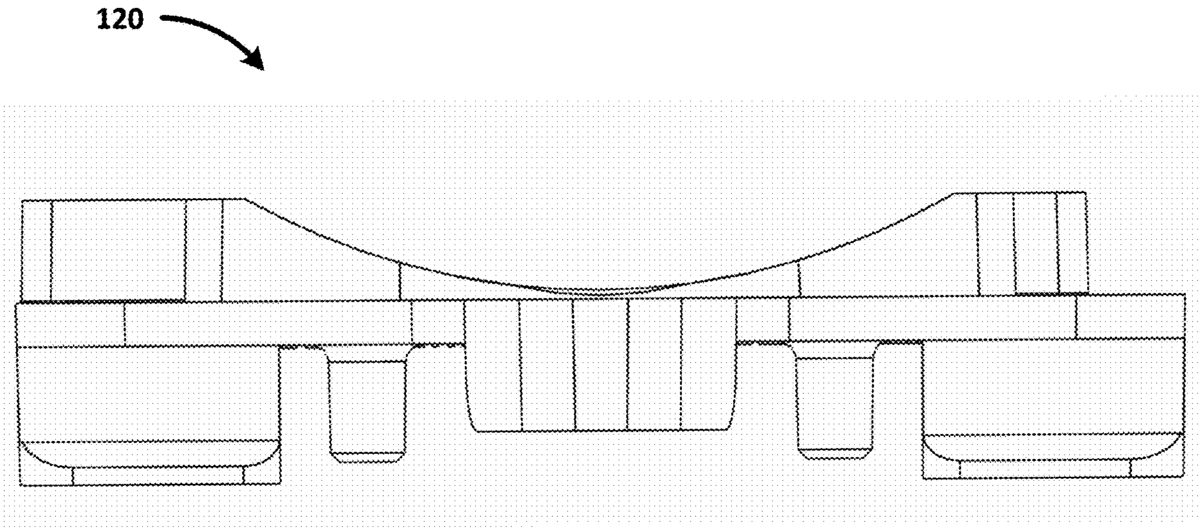
FIG. 17 depicts an exemplary bottom view of the exemplary quick coupling support body.

FIG. 9-17 depicts some exemplary views of an exemplary quick coupling support body 10. FIG. 11 depicts an exemplary rear perspective view of an exemplary quick coupling support body 120. The rear of the body includes a cavity 265 configured to receive the head portion 215 of the coupling member. The cavity 265 may, for example, be used to add additional support to the padding 250.

In some embodiments, the padding may, for example, include padding made of an elastomeric material. Padding material choice may, for example, be used to dynamically conform the padding to the contours and movements of the supported plant and/or pliable object. The padding may, for example, provide adaptable cushioning that mitigates the risk of damage while accommodating growth. In some embodiments, the padding may include of foam. Foam may, for example, offers the advantages of lightness and breathability. Foam padding may, for example, effectively supports plants by reducing the potential for surface abrasion and enhancing plant stability within the bracket. In some embodiments, the padding may, for example, be crafted from cloth. Cloth padding may, for example, be beneficial for its soft texture and flexibility, conforming to some plant shapes and sizes. Cloth padding may, for example, promote air circulation and moisture management, which may be important for maintaining the health and vigor of the plants supported by the bracket.

Figure 18:
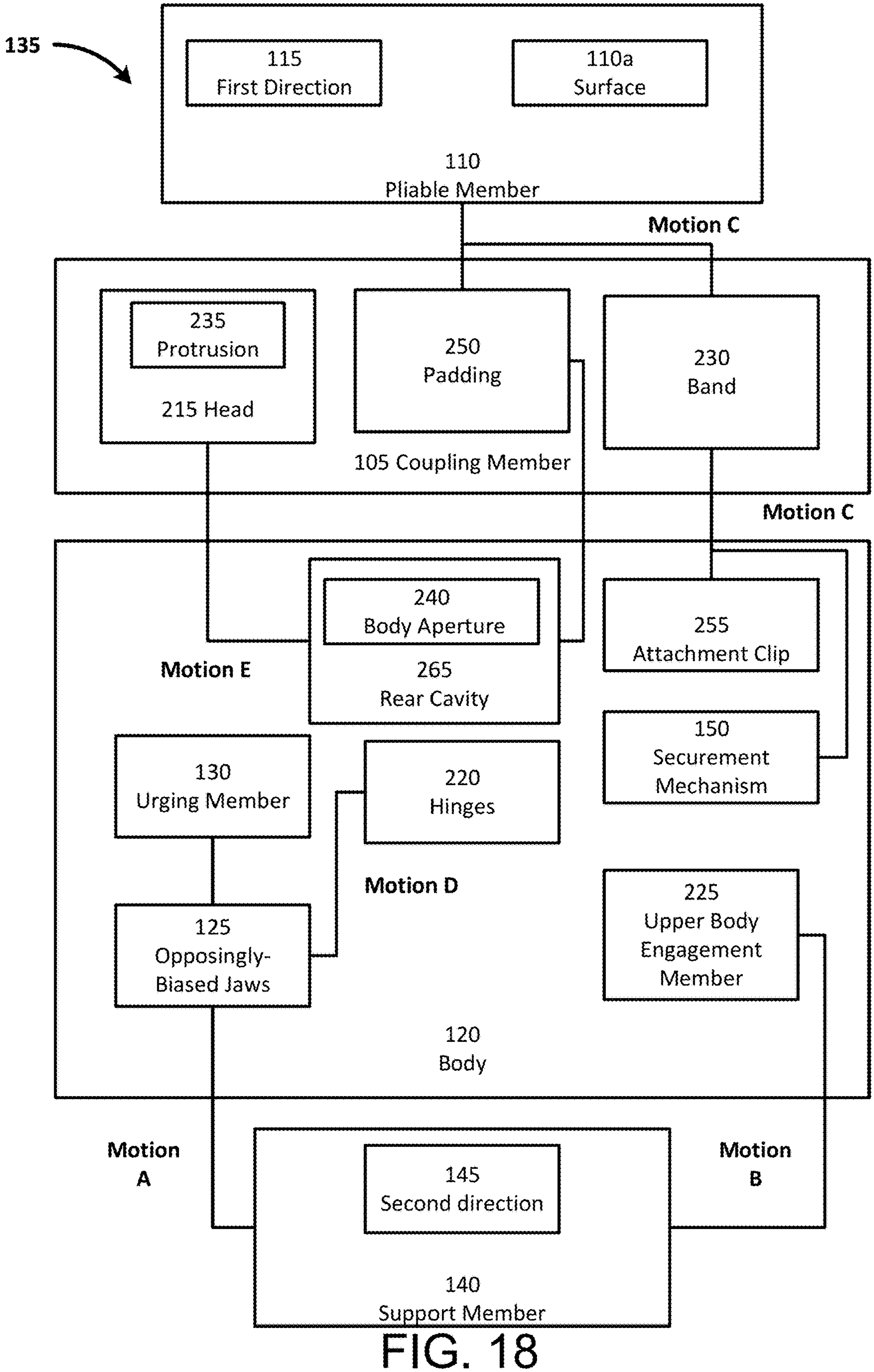
FIG. 18 depicts an exemplary system diagram illustrating the exemplary quick coupling support assembly.

FIG. 18 depicts an exemplary system diagram illustrating an exemplary quick coupling support system 135. The exemplary quick coupling system 135 includes a pliable member 110. The pliable member 110 includes the surface **110*a* of the pliable member. The surface 110*a* may include a range of textures, such as the bark of a tree or the delicate surface of a vine, which may make the choice of contact materials important to avoid damage. The orientation of the pliable member 110 orientation along a first direction 115** may, for example, allow the pliable member to extend in a natural growth direction, supported effectively by the surrounding assembly components.

The exemplary quick coupling system 135 includes the coupling member 105. The coupling member 105 includes the head 215. The head 215 includes the protrusion 235. The coupling member 105 includes the band 230. The coupling member may, for example, serves as the junction point between the pliable member 110 and the rest of the support system (e.g., body coupled to the support member). The coupling member may, for example, securely attach to the pliable member without causing harm, with the padding 250 providing a cushion to prevent damage during the engagement process of the band wrapping around the pliable object (Motion C). The head 215 may, for example, be releasably couple to the body aperture 240 as depicted in motion E. The band may, for example, be threaded through the attachment clip to couple the coupling member to the rear of the body. The head 215 of the coupling member may, for example, be received by a cavity located on the rear of the body. The band 230 may, for example, offer adjustability, to accommodate some sizes and shapes of pliable members, enhancing the flexibility and utility of the support system.

The exemplary quick coupling assembly 135 includes the body 120. The body 120 may, for example, house several mechanisms including the opposingly biased jaws 125. The body includes at least one upper body engagement member 225. The body includes the rear cavity 265. The body includes an urging member 130. The jaws and urging member may, for example, be actuated through motion B to couple the body to the support member 140 between the jaws and at least one upper body engagement member as depicted in motion A. The jaws may, for example, be coupled to the body via a hinge mechanism as shown in motion D. The body's design also includes a body aperture 240 for receiving the coupling member's head and the rear cavity 265 as depicted in motion E.

The exemplary quick coupling assembly 135 includes a support member 140. The support member 140 may, for example, extend along the second direction 145. The support member may, for example, include a cable. The support member may, for example, include an agricultural line The support member may, for example, include a cord.

In some embodiments, the coupling member may be attached to the body by a boss protruding from the body and engaging the padding. For example, an aperture in the coupling member may receive a protrusion from the body.

In some implementations, the body and coupling member may be unitarily formed (e.g., from a single and/or continuous material). The body and coupling member may, in some examples, be coupled by fasteners. The fasteners may, for example, include a threaded fastener. The fasteners may, for example, include rivets. The fasteners may, for example, include magnetic couplers. The fasteners may, for example, include adhesive The fasteners may, for example, include hook-and-loop fasteners. The fasteners may, for example, include VELCRO.

Figure 19:
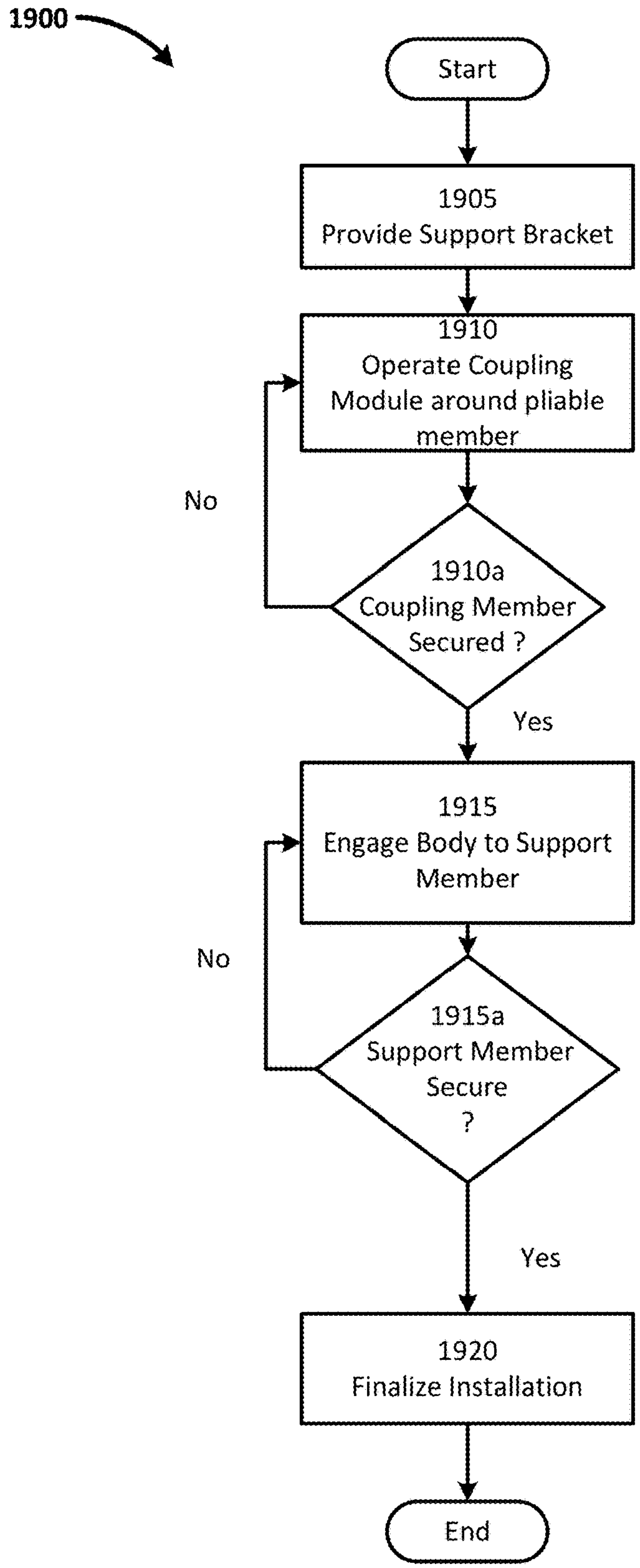
FIG. 19 depicts an exemplary flowchart illustrating an exemplary method of operation.

FIG. 19 depicts an exemplary flowchart illustrating an exemplary method 1900 of operation. In step 1905, the user selects and prepares the appropriate support bracket tailored to the pliable object's dimensions and support needs. In step 1910, the user attaches and secures the coupling module around the pliable object to ensure a firm grip. In step, **1910*a* the user verifies that the coupling member is securely attached; and if not, adjusts and retests. In step 1915, the user connects the bracket body to the support member, ensuring proper alignment and stability. In step 1915*a*, the user confirms the support member is securely fastened; if insecure, adjusts and reaffirms attachment. In step 1920**, the user performs a final inspection to ensure all components are secure and the installation is complete.

In some methods of operation, the user may squeeze the jaws of the coupling member together, which temporarily widens the opening, allowing the insertion of the hook into the designated slot. Once the hook is engaged, the jaws are released, allowing them to return to their original position. This action clamps down around the hook, securing it in place. This mechanism ensures that the coupling member holds the pliable member firmly, preventing any slip or movement that could potentially damage the plant.

In some methods of operation, the user may follow the successful coupling of the member and the pliable object, wrap a strap around the support member. The strap may, for example, provide additional stability and ensures that the support bracket remains aligned with the intended direction of support. After wrapping, the effectiveness of the strap's length may, for example, be adjusted by selecting one of several apertures available on the strap. This adjustment may, for example, allow for a custom fit that accommodates the thickness of the support member and the specific tension requirements needed to maintain the stability of the bracket.

In some embodiments, the body is structured to receive a strap with a padding (e.g., to cushion a sapling's trunk) configuration along a predetermined aperture. The body includes an engagement member. The engagement member may, for example, include an opposingly biased jaws actuated by an urging member (e.g., spring-loaded) configured such that the jaws releasably couple to a support member (e.g., cable). The strap may releasably couple to pliable object extending along a first axis (e.g., a vertically oriented tree). The tree padding may be situated between the body and the tree. The strap may be tightened utilizing a series of predetermined apertures extending along the path of the strap.

In some embodiments, the coupling member may be designed with interchangeable padding options, allowing the user to select the appropriate level of cushioning based on the specific needs of the plant species being supported. This padding may be useful in situations where the plant has a more delicate or sensitive bark, requiring extra protection. The coupling member may be adjustable in tension, enabling the user to modify the tension applied by the coupling member based on the size and weight of the plant (e.g., user may keep loosely coupled).

In some embodiments, the plant support bracket may incorporate a quick-release mechanism within the coupling member, allowing for rapid attachment and detachment from the pliable object. A quick-release mechanism may be advantageous in commercial agricultural operations where efficiency and speed are important. The quick-release mechanism may be integrated with the predetermined apertures along the strap, enabling the user to swiftly adjust the tension around trunk or completely remove the strap without delay.

Although various embodiments have been described with reference to the figures, other embodiments are possible.

Although an exemplary system has been described with reference to FIGS. 1-19, other implementations may be deployed in other industrial, scientific, medical, commercial, and/or residential applications.

In some embodiments, the plant support bracket may, for example, be adapted for use in industrial applications, such as in large-scale agricultural facilities or greenhouses where efficient space management and precision plant care are important. The plant support bracket may, for example, allow for systematic organization and secure handling of large numbers of plants and/or crops. The plant support bracket may, for example, improve productivity and ease of maintenance in commercial farming operations.

In some embodiments, the plant support bracket may be utilized in scientific research environments, particularly in botany and agriculture studies where controlled plant growth and support may, for example, be necessary. The bracket may, for example, be used to adjust to various plant sizes and its coupling system may, for example, be used in experiments that require careful measurement and observation. The plant support bracket may, for example, be used to support the cultivation of rare and/or delicate species under controlled conditions.

In some embodiments, the plant support bracket may, for example, be used in therapeutic horticulture programs where patient interaction with plants is used for rehabilitation and recovery. The plant support bracket may, for example, be used for its adjustability and secure mechanisms make to create a safe and accessible use-case for individuals with varying physical capabilities.

In some embodiments, the plant support bracket may, for example, be used in retail nurseries, florists, and landscape design businesses. The plan support bracket may, for example, be used to support the aesthetic arrangement and healthy growth of plants, enhancing the visual appeal of commercial spaces.

In some embodiments, the plant support bracket may, for example, be used by residential gardening enthusiasts. The plant support bracket may, for example, be used for its user-friendly design to facilitate home gardening by making plant support manageable for novices and aesthetically pleasing. The bracket's adjustability may, for example, small houseplants. The bracket may, for example, be used for larger backyard garden projects. The bracket may, for example, be used to adapt plants growth and to control a garden's layout.

A number of implementations have been described. Nevertheless, it will be understood that various modifications may be made. For example, advantageous results may be achieved if the steps of the disclosed techniques were performed in a different sequence, or if components of the disclosed systems were combined in a different manner, or if the components were supplemented with other components. Accordingly, other implementations are contemplated within the scope of the following claims.

What is claimed is:

1. A plant support bracket comprising:

a body having a first side and a second side;

a coupling member configured to releasably couple, on the first side of the body, a pliable object extending along a first axis in a first direction comprising:

a head comprising an interior aperture comprising peripheral walls configured such that the walls deform to couple to the coupling member to the body;

a band extending from a side of the head configured such that the band is secured to an opposing side of the body; and a boss protrusion from the head, the boss protrusion configured such that the coupling member is releasably attached to the band at multiple predetermined points to a predetermine area on the body;

a padding fixedly coupled to the opposing side of the head and configured such that the padding is disposed between the pliable object and the body; and opposingly biased jaws actuated by an urging member and configured such that the jaws releasably couple the body, on the second side of the body, to a support member extending along a second axis in a second direction intersecting the first direction, wherein the body further comprises:

at least one upper body engagement member configured such that at least one jaw applies force to the support member against the at least one upper body engagement member such that the support member is releasably coupled to the body;

a fastening clip disposed on a side of the body and configured such the band extends from a side of the body through the fastening clip;

an inner coupling member securement aperture configured to fasten to the coupling the head such that the walls releasably engage the coupling member securement aperture affixing the coupling member to the body;

an exterior coupling member securement cavity with peripheral walls configured to releasably engage the exterior of the coupling member head; and a securing clip positioned on an opposing side of the body configured such that the securing clip receives and secure the band to the body.

2. A plant support bracket comprising:

a body having a first side and a second side, a coupling member configured to releasably couple, on the first side of the body, a pliable object extending along a first axis in a first direction; and opposingly biased jaws actuated by an urging member and configured such that the jaws releasably couple the body, on the second side of the body, to a support member extending along a second axis in a second direction intersecting the first direction;

wherein the coupling member further comprises:

a head comprising an interior aperture comprising peripheral walls configured such that the walls deform to couple to the coupling member to the body;

a band extending from a side of the head configured such that the band is secured to an opposing side of the body; and a boss protrusion is configured such that the coupling member is releasably attached to the band at multiple predetermined points to a predetermine area on the body.

3. The plant support bracket of claim 2, wherein the body further comprises:

at least one upper body engagement member configured such that at least one jaw applies force to the support member against the at least one upper body engagement member such that the support member is releasably coupled to the body.

4. The plant support bracket of claim 2, wherein the body further comprises:

a pair of upper body engagement members configured such that each opposing jaw applies force to the support member into a corresponding body engagement member of the pair such that the support member is releasably couple to the body.

5. The plant support bracket of claim 2, wherein the urging member comprises a spring disposed between the opposing jaws such that the jaws are urged in opposing directions.

6. The plant support bracket of claim 2, wherein the body further comprises:

a fastening clip disposed on a side of the body and configured such the band extends from a side of the body through the fastening clip;

an inner coupling member securement aperture configured to fasten to the coupling the head such that the walls releasably engage the coupling member securement aperture affixing the coupling member to the body;

an exterior coupling member securement cavity with peripheral walls configured to releasably engage an exterior of the coupling member head; and a securing clip positioned on an opposing side of the body configured such that the securing clip receives and secures the band to the body.

7. The plant support bracket of claim 2, wherein the coupling member further comprises:

a padding fixedly coupled to the opposing side of the head and configured such that the padding is disposed between the pliable object and the body.

8. The plant support bracket of claim 7, wherein the peripheral walls of a cavity of the body are configured such the walls releasably engage an exterior of the padding.

9. The plant support bracket of claim 7, wherein the padding comprises an elastomeric material.

10. The plant support bracket of claim 7, wherein the padding comprises foam.

11. The plant support bracket of claim 7, wherein the padding comprises cloth.

12. The plant support bracket of claim 7, wherein the padding is configured such that the padding deforms to cushion an exterior of the pliable object to prevent damage to the exterior of the pliable object.

13. The plant support bracket of claim 12, wherein the exterior of the pliable object is bark of a tree.

14. The plant support bracket of claim 12, wherein the exterior of the pliable object is an exterior surface of a vine.

15. The plant support bracket of claim 12, wherein the exterior of the pliable object an exterior surface of a plant.

16. The plant support bracket of claim 2, wherein the pliable object comprises a plant.

17. The plant support bracket of claim 2, wherein the pliable object comprises a tree.

18. The plant support bracket of claim 2, wherein the pliable object comprises a vine.

* * * * *